United States Patent
Zhu et al.

(10) Patent No.: US 12,425,991 B2
(45) Date of Patent: Sep. 23, 2025

(54) USE OF PHYSICAL BROADCAST CHANNEL DEMODULATION REFERENCE SIGNAL TO SPEED UP NEIGHBOR CELL MEASUREMENT

(71) Applicant: QUALCOMM Incorporated, San Diego, CA (US)

(72) Inventors: Jun Zhu, San Diego, CA (US); Kang Gao, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 809 days.

(21) Appl. No.: 17/707,123

(22) Filed: Mar. 29, 2022

(65) Prior Publication Data

US 2023/0319740 A1 Oct. 5, 2023

(51) Int. Cl.
*H04W 56/00* (2009.01)
*H04L 5/00* (2006.01)
*H04L 27/26* (2006.01)
*H04W 24/10* (2009.01)
*H04W 48/16* (2009.01)

(52) U.S. Cl.
CPC ......... *H04W 56/001* (2013.01); *H04L 5/0051* (2013.01); *H04L 27/26025* (2021.01); *H04W 24/10* (2013.01); *H04W 48/16* (2013.01)

(58) Field of Classification Search
CPC ... H04W 56/001; H04W 24/10; H04W 48/16; H04L 5/0051; H04L 27/26025; H04B 7/088; H04B 7/06952
See application file for complete search history.

(56) References Cited

U.S. PATENT DOCUMENTS

| | | | | |
|---|---|---|---|---|
| 2019/0149383 | A1* | 5/2019 | Ko | H04L 5/0053 370/329 |
| 2020/0015239 | A1* | 1/2020 | Guey | H04L 27/2692 |
| 2020/0068420 | A1* | 2/2020 | Chen | H04W 36/0085 |
| 2020/0367173 | A1 | 11/2020 | Ryu et al. | |
| 2023/0413240 | A1* | 12/2023 | Guan | H04W 72/0453 |

OTHER PUBLICATIONS

International Search Report and Written Opinion—PCT/US2023/064860—ISA/EPO—Jun. 16, 2023.

* cited by examiner

*Primary Examiner* — Gary Mui
*Assistant Examiner* — Yewon Kim
(74) *Attorney, Agent, or Firm* — Arent Fox, LLP

(57) ABSTRACT

In a wireless communication system, a user equipment (UE) may measure synchronization signal blocks (SSBs) to evaluate neighbor cells. A UE configured with multiple potential receive beams may conventionally measure one receive beam per SSB. A UE may improve the speed of receive beam measurements by performing measurements using demodulation reference signals (DMRS) of physical broadcast channel (PBCH) symbols, which occur twice per SSB. The UE may perform a cell search for neighbor cells available to the UE in a synchronized network to determine a number of the neighbor cells and timing information for each of the neighbor cells. The UE may measure one or more receive beams using the DMRs of the PBCHs of SSBs received from the neighbor cells. Each receive beam may be measured during a beam switch time unit including a PBCH symbol from each of the neighbor cells according to the timing information.

30 Claims, 10 Drawing Sheets

USE OF PHYSICAL BROADCAST CHANNEL DEMODULATION REFERENCE SIGNAL TO SPEED UP NEIGHBOR CELL MEASUREMENT

BACKGROUND

Technical Field

The present disclosure relates generally to communication systems, and more particularly, to use of physical broadcast channel (PBCH) demodulation reference signal (DMRS) to speed up neighbor cell measurement.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a non-transitory computer-readable medium, and an apparatus for a user equipment (UE) are provided. The method includes performing a cell search for neighbor cells available to the UE in a synchronized network to determine a number of the neighbor cells and timing information for each of the neighbor cells. The method includes measuring one or more receive beams using demodulation reference signals (DMRS) of physical broadcast channel (PBCH) symbols of synchronization signal blocks (SSBs) received from the neighbor cells, each receive beam measured during a beam switch time unit including a PBCH symbol from each of the neighbor cells according to the timing information.

The present disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
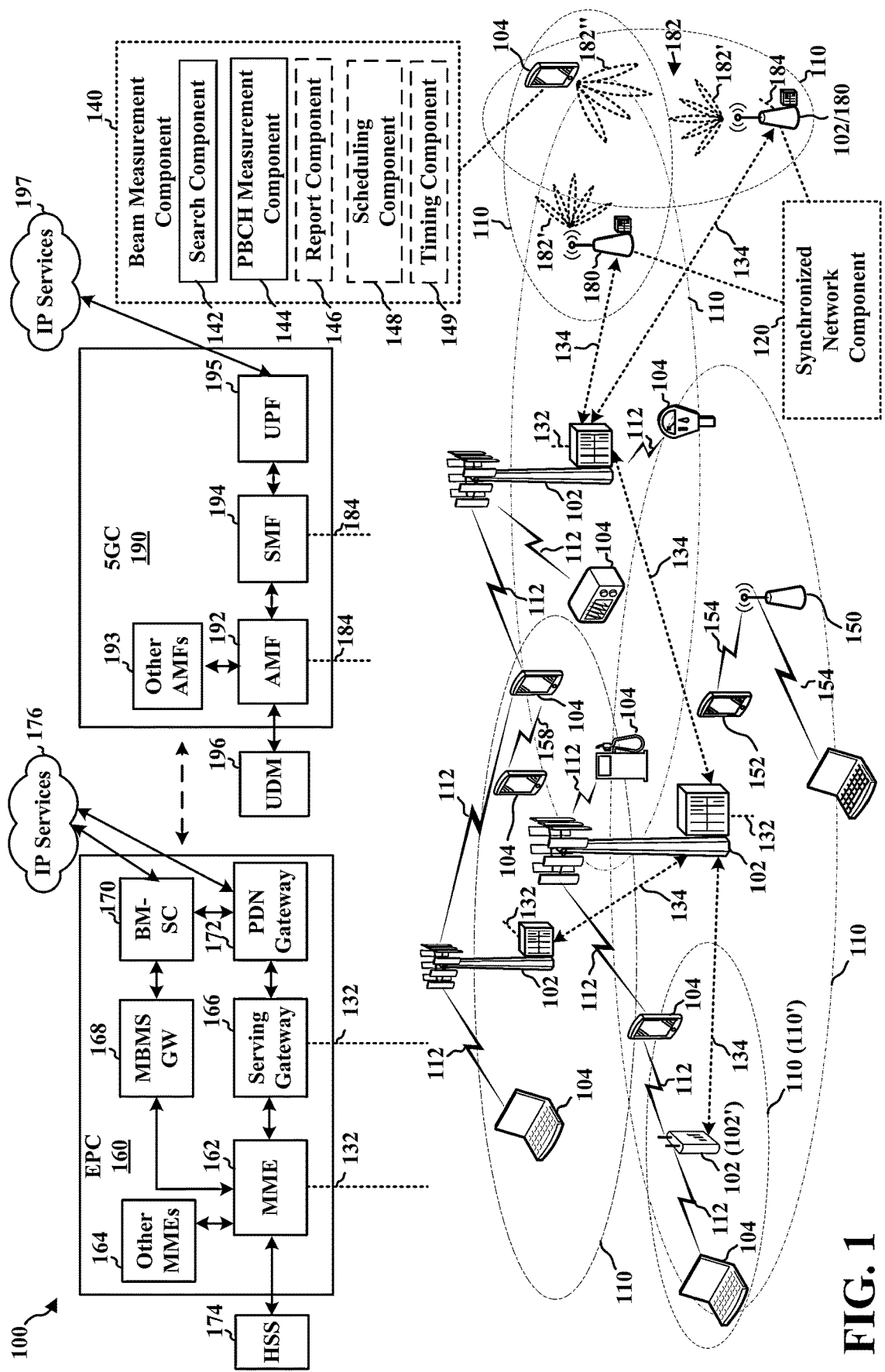
FIG. 1 is a diagram illustrating an example of a wireless communications system including an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

In order to combat high propagation loss in high frequency bands such as millimeter wave (mmW) bands, 5G NR may utilize a pair of gNB beam and UE beam to form a beam pair link between the gNB and the UE, which carries control and data channels. The 5G NR Rel-15 specification provides a synchronization signal block (SSB) for the UE to conduct initial access as well as cell, gNB, and UE beam tracking. Typically, the SSBs are transmitted in an SSB burst including the SSB on different beams. An SSB burst may be transmitted at a default periodicity of 20 ms, but periodicities of 5 ms, 10 ms, or a multiples of 20 ms may be configured.

Each SSB consists of four symbols carrying a respective signal arranged in a mostly time division multiplexing (TDM) manner: primary synchronization signal (PSS), physical broadcast channel (PBCH), secondary synchronization signal (SSS), and PBCH. The PBCH is actually transmitted over the last three symbols of the SSB, but in the third symbol, most resource blocks (RBs) are for the SSS. The PBCH includes both resources used for a demodulation reference signal (DMRS) and resources used for traffic. The SSS is usually used for beam scanning and beam reporting. For serving cell and different neighbor cells, a UE may need to use different UE beams to form different beam pair links. In order to measure different cells, the UE needs to switch UE beams to point to different cells to assure signal quality or identify a beam pair with the best signal quality. As the number of potential beams and neighbor cells increases, the time for the UE to conduct a UE beam scan on both serving and neighbor cells solely based on the SSS symbol increases.

In a synchronous network, the frame timing is generally aligned between neighbor cells. However, a synchronous network may tolerate an offset between neighbor cells. That is, the timing of serving and neighbor cells may not be perfectly aligned. For a synchronous network, the timing offset may be +/−3 microseconds (μs) at the gNB side, and the UE may expect the maximum offset to be 3+1.7=4.7 μs, where the 1.7 μs covers the propagation delay.

In an aspect, the present disclosure provides techniques for a UE to use the DMRS of the PBCH symbols to speed up the UE beam scan for parallel measurements on both serving and neighbor cells. As there are two PBCH symbols per SSB, the use of the DMRS of the PBCH can effectively increase the speed of a beam scan by 2 times. The use of DMRS may provide more measurement opportunities and better support of mobility. The use of DMRS may be able to support parallel measurement on both serving and neighbor cells. For a UE to perform beam measurements on the DMRS of PBCH symbols of different cells of a Synchronous Network, the offset may determine how often the UE is able to switch UE beams for measurement. The UE may obtain timing information for detected cells based on a cell search for neighbor cells that determines a number of neighbor cells and timing information for each of the neighbor cells (e.g., based on the PSS and SSS symbols of the SSBs). Based on the timing information, the UE may determine a maximum relative timing offset between the neighbor cells. The UE may perform measurements for one or more receive beams using the DMRS of PBCH symbols of the SSBs during a beam switch time unit including a PBCH symbol from each of the neighbor cells. The beam switch time unit may be based on the maximum relative timing offset between neighbor cells. For example, the beam switch time unit may be at least a sum of the maximum timing offset and a length of a symbol according to a subcarrier spacing. In some implementations, a beam switch time unit with a duration of two symbols may be used unless the maximum relative timing offset is greater than one symbol.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network (e.g., a 5G Core (5GC) 190). The base stations 102 may include macrocells (high power cellular base station) and/or small cells (low power cellular base station). The macrocells include base stations. The small cells include femtocells, picocells, and microcells.

One or more of the UEs 104 may include a beam measurement component 140 that measures beams for the serving cell and neighbor cells. The beam measurement component 140 may include a search component 142 configured to perform a cell search for neighbor cells available to the UE in a synchronized network to determine a number of the neighbor cells and timing information for each of the neighbor cells. The beam measurement component 140 may include PBCH measurement component 144 configured to measure one or more receive beams using DMRS of PBCH symbols of a SSB received from the neighbor cells. Each receive beam may be measured during a beam switch time unit including a PBCH symbol from each of the neighbor cells according to the timing information. In some implementations, the beam measurement component 140 may optionally include a report component 146 configured to transmit a beam measurement report including measurements of each of the receive beams to a serving cell. In some implementations, the beam measurement component 140 may optionally include a scheduling component 148 configured to schedule measurements of a plurality of receive beams over one or more SSBs based on the beam switch time unit.

In an aspect, one or more of the base stations 102 may include a synchronized network component 120 that synchronizes the base station with other base station in the synchronized network. For example, the synchronized network component 120 may maintain a timing difference of less than 3 μs between the base station 102/180 and other base stations.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The backhaul links 132 may be wired or wireless. The base stations 102 configured for 5G NR (collectively referred to as Next Generation RAN (NG-RAN)) may interface with 5GC 190 through backhaul links 184. The backhaul links 184 may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and a physical sidelink feedback channel (PSFCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 one or more transmit beams 182'. The UE 104 may receive the beamformed signal from the base station 180 on one or more receive beams 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. In the case of a synchronous network, cells from base stations 180 may be generally aligned. A different receive beam 182" may provide the best performance for each cell. A UE may perform a neighbor cell search and beam measurements to identify the best receive beam 182" for each cell.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
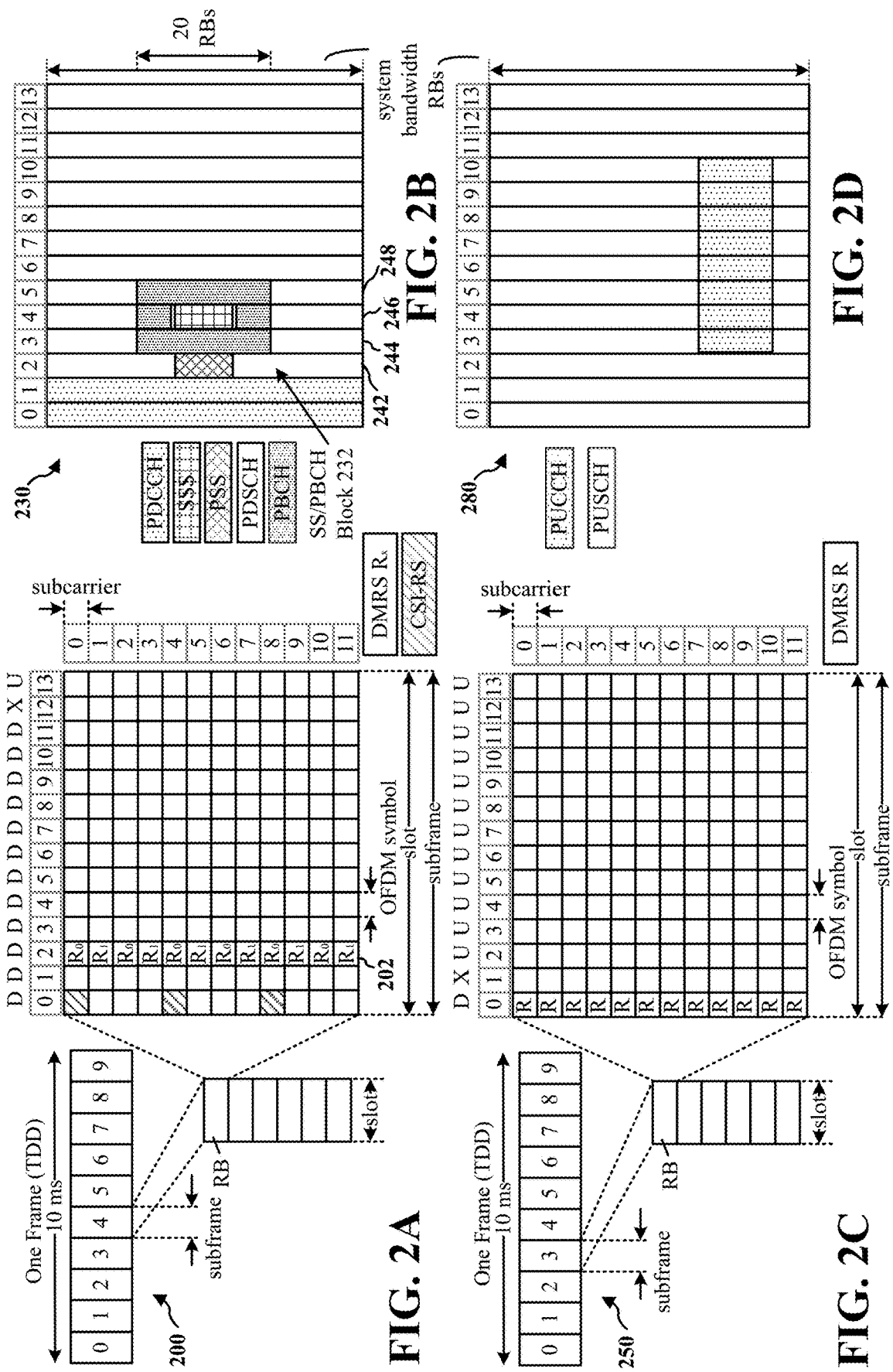
FIG. 2A is a diagram illustrating an example of a first frame, in accordance with certain aspects of the present description.
FIG. 2B is a diagram illustrating an example of downlink (DL) channels within a subframe, in accordance with certain aspects of the present description.
FIG. 2C is a diagram illustrating an example of a second frame, in accordance with certain aspects of the present description.
FIG. 2D is a diagram illustrating an example of uplink (UL) channels within a subframe, in accordance with certain aspects of the present description.

FIGS. 2A-2D are resource diagrams illustrating example frame structures and channels that may be used for uplink, downlink, and sidelink transmissions to a UE 104 including a beam measurement component 140. FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) 202 (indicated as Rx for one particular configuration, where 100x is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 (e.g., a PSS symbol 242) of particular subframes of a frame. The PSS is used by a UE 104 to determine subframe/symbol timing and a physical layer identity. A secondary synchronization signal (SSS) may be within symbol 4 (e.g., a SSS symbol 246) of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS 202. The physical broadcast channel (PBCH), which carries a master information block (MIB), may be logically grouped with the PSS and SSS to form a synchronization signal (SS)/PBCH block, also referred to as an SSB 232. The PBCH may be transmitted over symbols 3-5 of a subframe, with symbols 3 and 5, for example, being referred to as PBCH symbols 244, 248 because those symbols include mostly RBs for the PBCH. The DMRS 202 may be interleaved with the RBs for the PBCH (e.g., every fourth RB) to allow decoding of the PBCH. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
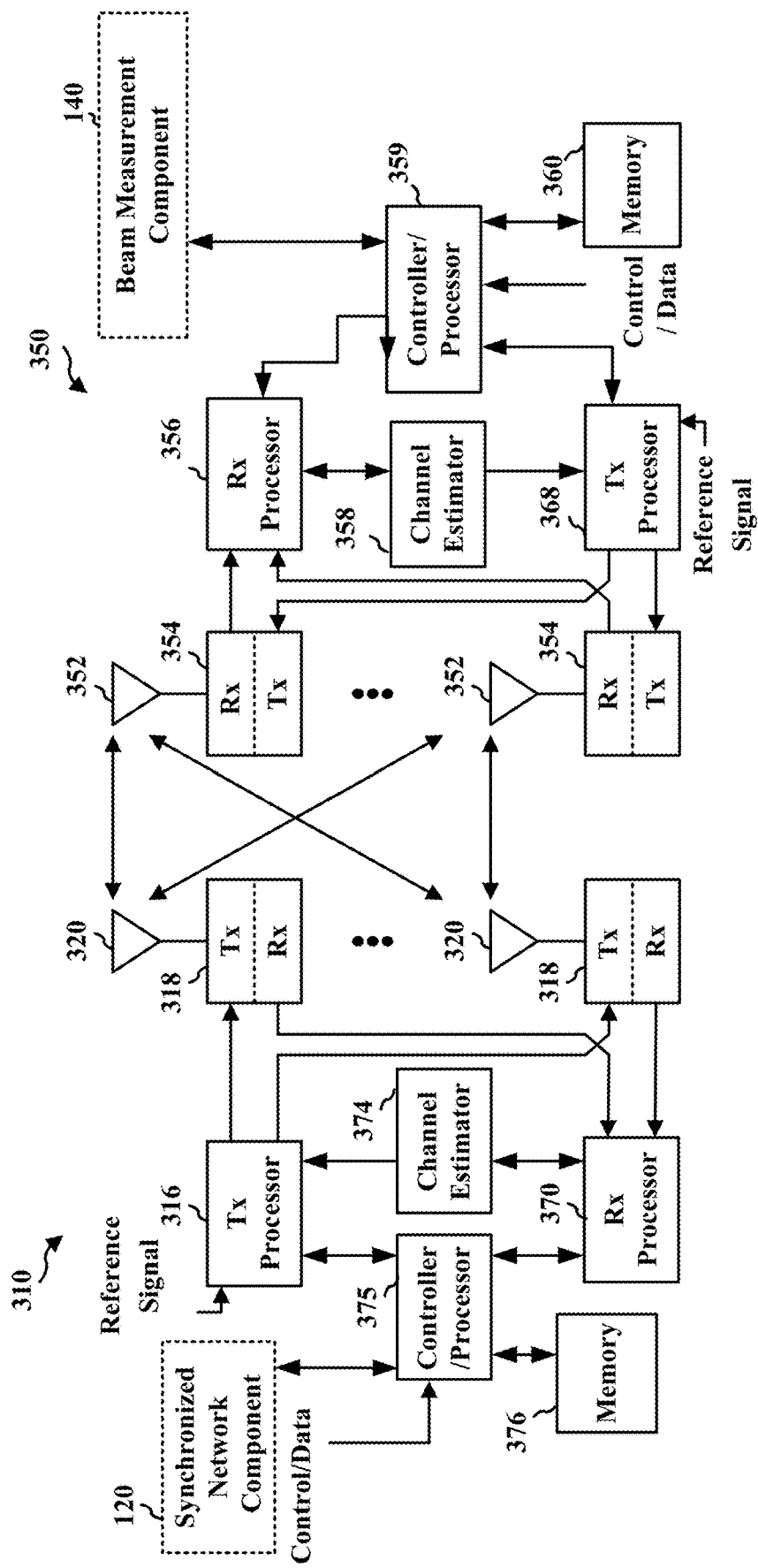
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate an RF carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160 or 5GC 190. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the beam measurement component 140 of FIG. 1.

At least one of the Tx processor 316, the Rx processor 370, and the controller/processor 375 may be configured to perform aspects in connection with the synchronized network component 120 of FIG. 1.

Figure 4:
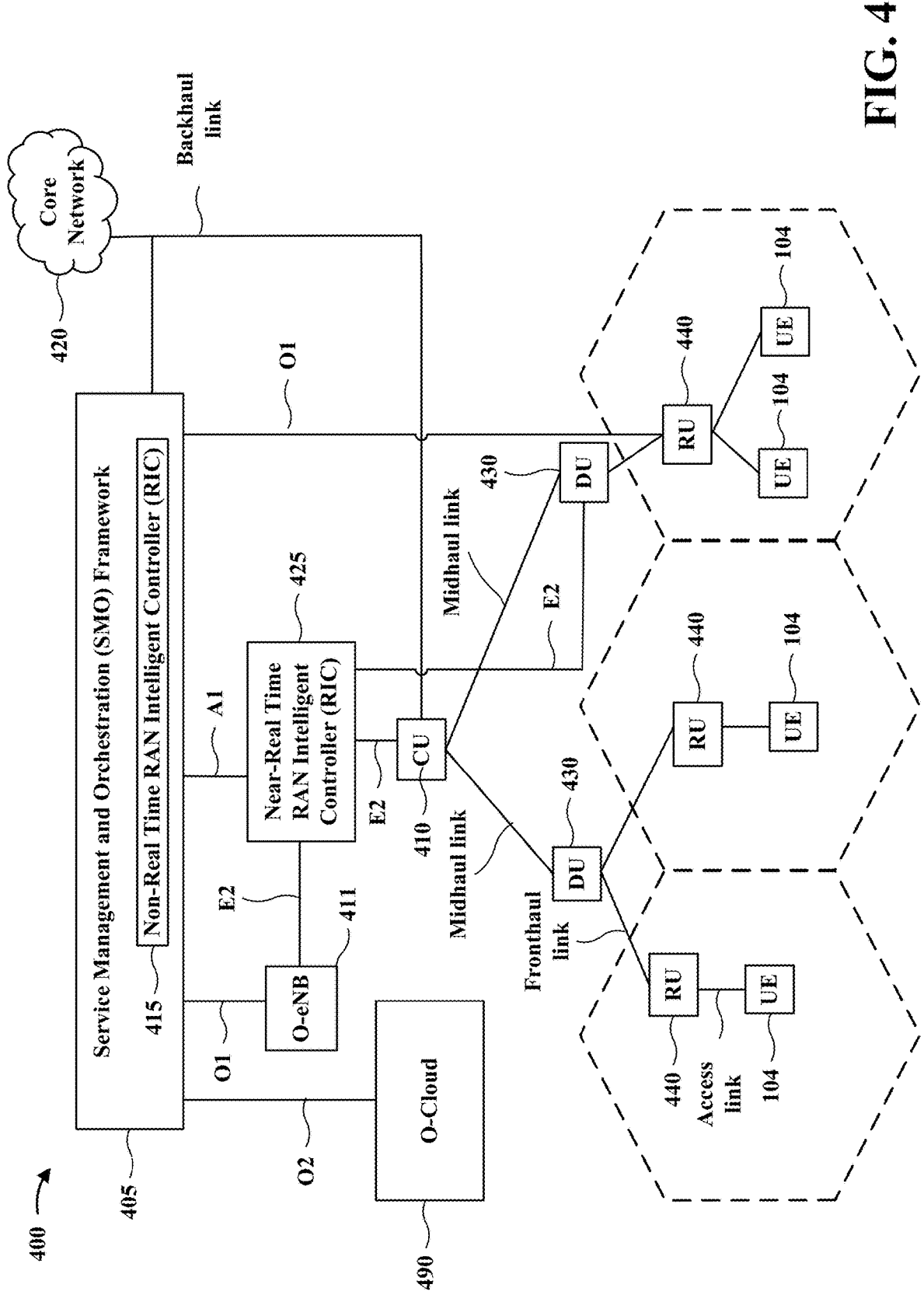
FIG. 4 is a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (MC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT MC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT MC 415 from non-network data sources or from network functions. In some examples, the Non-RT MC 415 or the Near-RT MC 425 may be configured to tune RAN behavior or performance. For example, the Non-RT MC 415 may monitor long-term trends and patterns for performance and employ AI/ML models to perform corrective actions through the SMO Framework 405 (such as reconfiguration via O1) or via creation of RAN management policies (such as A1 policies).

Figure 5:
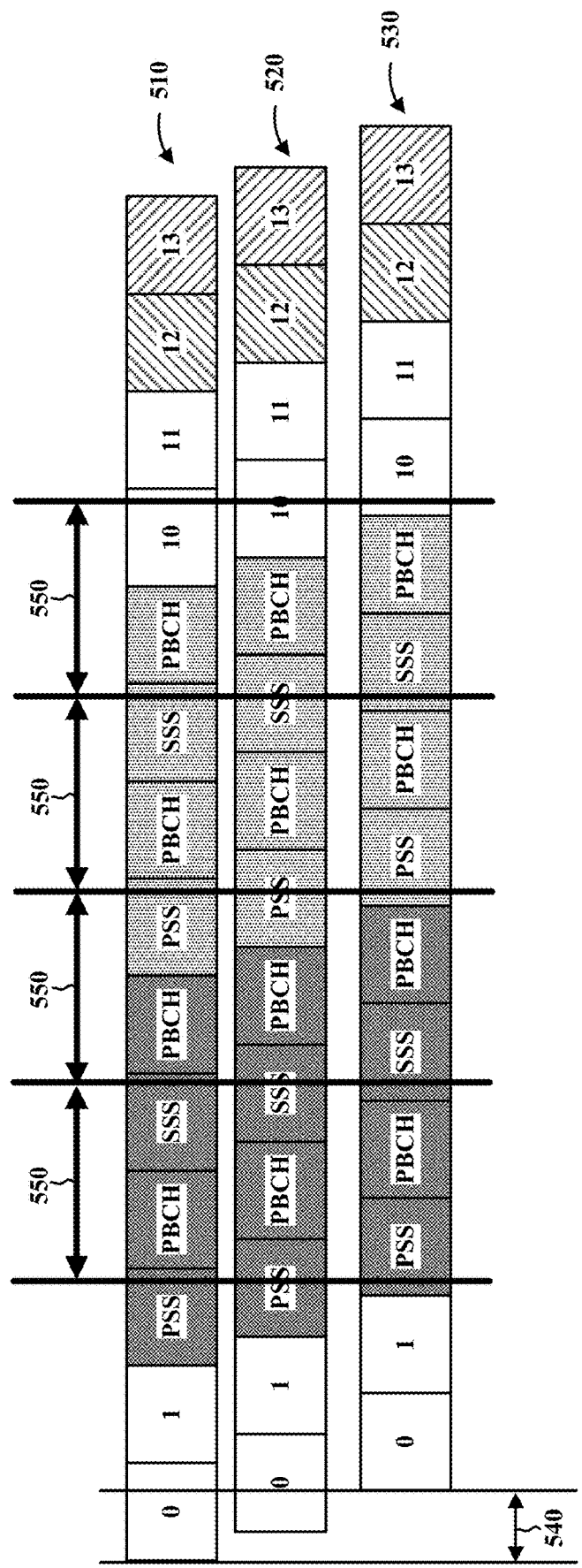
FIG. 5 is a diagram of synchronization signal blocks (SSBs) received at a UE 104 from different cells in a synchronized network.

FIG. 5 is a diagram of SSBs received at a UE 104 from different cells in a synchronized network. For example, a slot is illustrated for each of three cells 510, 520, 530. The synchronized network may be configured with a subcarrier spacing of 120 kHz. As illustrated, each slot may include a burst of two SSBs. The timing of the slots may differ due to timing differences of the cells and/or different propagation delays to a UE. The UE 104 may obtain the timing information of each cell by performing a cell search based on the PSS and SSS signals. For instance, the UE 104 may determine a maximum timing offset 540 between the cells 510, 520, 530. The UE may monitor the SSBs of the cells using different receive beams. The UE may perform measurements on the DMRS of the PBCH symbols during a beam switch time unit 550. The beam switch time unit 550 may be based on the timing information of the cells such as the maximum timing offset 540. The duration of the beam switch time unit 550 may be selected such that each beam switch time unit 550 includes a PBCH symbol for each cell 510, 520, 530. For example, the duration of the beam switch time unit 550 may be at least a duration of a symbol plus the maximum timing offset 540. In some implementations, the duration of the beam switch time unit 550 may be selected such that the beam switch time units 550 occur consecutively. In some implementations, the beam switch time units 550 may be spaced apart by a gap (not shown).

Figure 6:
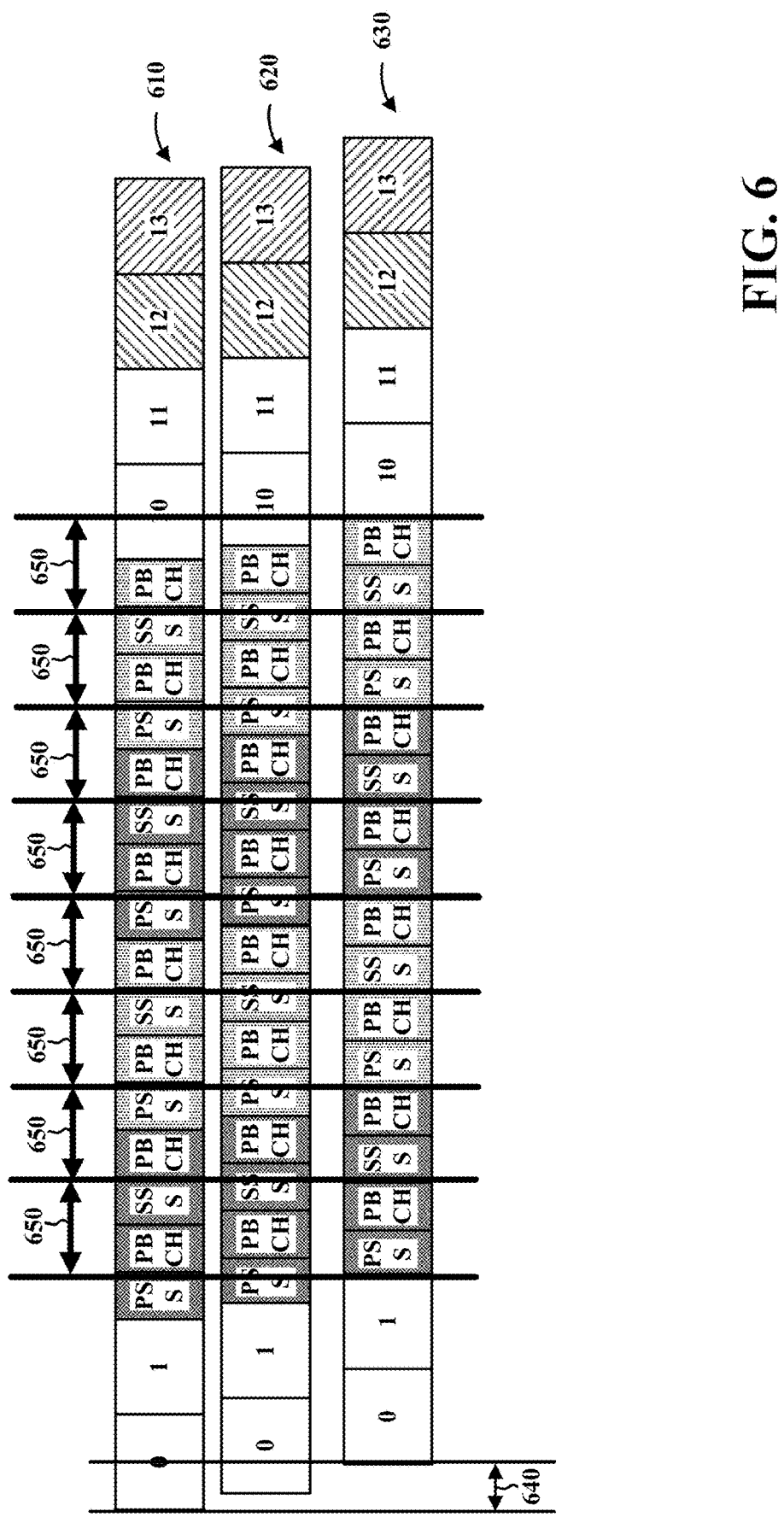
FIG. 6 is a diagram of SSBs received at a UE from different cells in another synchronized network with a greater subcarrier spacing.

FIG. 6 is a diagram of SSBs received at a UE 104 from different cells in another synchronized network. For example, a slot is illustrated for each of three cells 610, 620, 630. The synchronized network may be configured with a subcarrier spacing of 240 kHz. Each slot may include a burst of four SSBs. The UE 104 may determine a maximum timing offset 640 between the cells 610, 620, 630. As noted above, the UE expects a maximum timing offset of no more than 4.7 µs. At 240 kHz, the duration of a symbol may be approximately 4.5 µs. In FIG. 6, the maximum timing offset 640 is illustrated as less than 4.5 µs. Accordingly, a duration of the beam switch time unit 650 may be set such that each beam switch time unit 650 includes a PBCH symbol for each cell 610, 620, 630.

Figure 7:
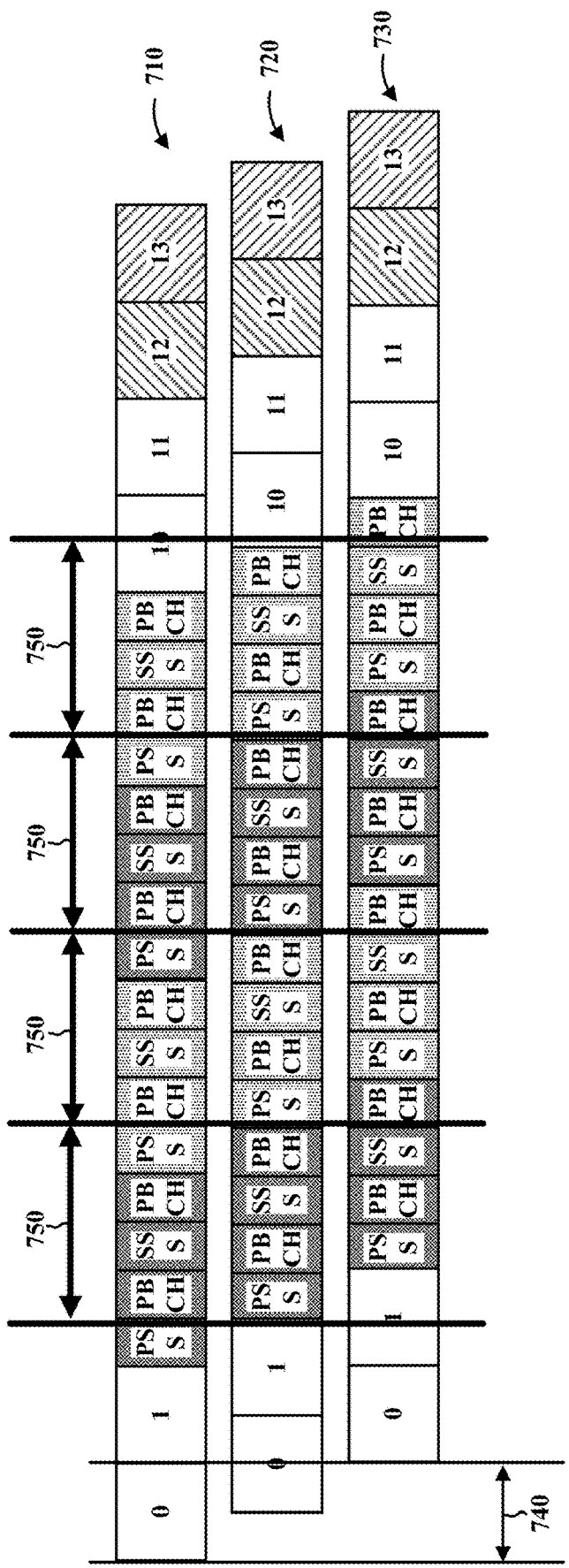
FIG. 7 is a diagram of SSBs received at a UE from different cells in another synchronized network with a maximum timing offset greater than a duration of a symbol.

FIG. 7 is a diagram of SSBs received at a UE 104 from different cells in another synchronized network with a maximum timing offset 740 greater than a duration of a symbol. For example, the maximum timing offset 740 may be 4.6 µs, which may satisfy requirements based on differences at the base station and propagation delays. However, a beam switch time unit 750 that is at least the maximum timing offset 740 plus a symbol length would be greater than a duration of two symbols. Accordingly, a longer beam switch time unit 750 may be selected to ensure that at least one PBCH symbol included within the beam switch time unit 750 for each cell 710, 720, 730. For example, the beam switch time unit 750 may have a duration of four symbols. The beam switch time unit 750 may also include an SSS symbol for each cell, so the beam measurement may alternatively or additionally be based on the SSS symbol.

In general, a beam switch time unit of two symbols may be used when the maximum timing offset is less than a duration of a symbol and a beam switch time unit of four symbols may be used when the maximum timing offset is greater than a duration of a symbol. The following table provides example configuration of the beam switch time unit.

TABLE 1

| SCS | Range of maximum timing offset | Beam switch time unit |
| --- | --- | --- |
| ≤120 kHz | 0-1 symbol | 2 symbols |
| 240 kHz | 0-1 symbol | 2 symbols |
| 240 kHz | >1 symbol | 4 symbols |

In an aspect, the beam switch time unit may be dynamic because the maximum timing offset may vary based on timing drift and propagation delay. For instance, if the UE moves closer to one neighbor cell and further from another neighbor cell, the difference in propagation delay may increase the maximum timing offset beyond the 1 symbol threshold. Accordingly, the UE may determine the maximum timing offset based on the neighbor cell search and schedule measurements based on the DMRS of the PBCH symbols according to the maximum timing offset.

Figure 8:
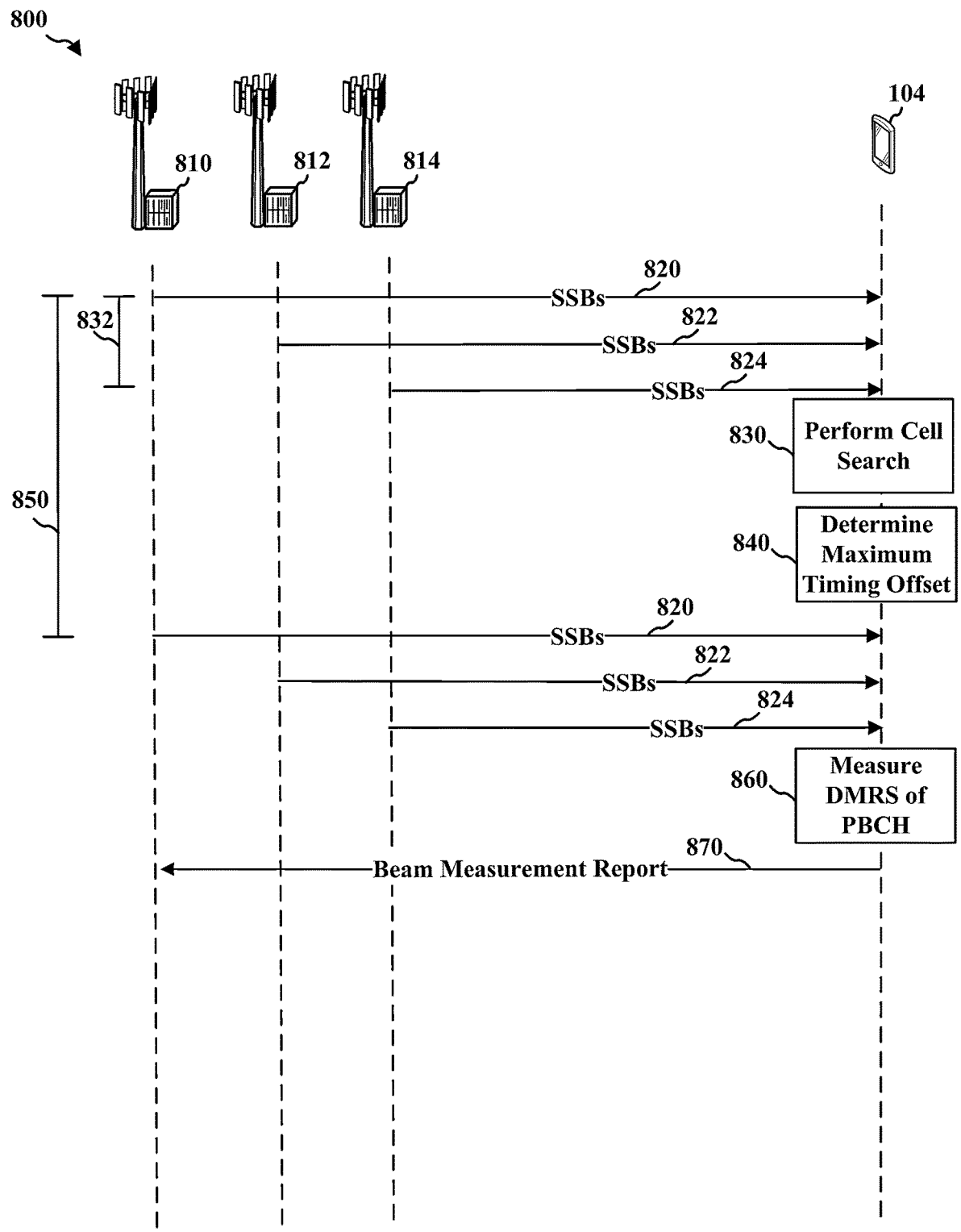
FIG. 8 is a message diagram illustrating example messages for beam measurement.

FIG. 8 is a message diagram 800 illustrating example messages for beam measurement. A UE 104 may be connected to a serving cell 810 and may be in a coverage area of neighbor cells 812 and 814. The cells 810, 812, 814 may be part of a synchronized network. As such, the cells 810, 812, 814 may transmit respective SSBs 820, 822, 824 at approximately the same time (e.g., within 3 µs of each other).

At block 830, the UE 104 may perform a cell search. For example, the UE 104 may identify each of the cells 810, 812, 814 based on the PSS and SSS symbols of the SSBs 820, 822, 824. The UE 104 may also determine timing information for each cell 810, 812, 814.

At block 840, the UE may determine the maximum timing offset 832 between the SSBs 820, 822, 824. For example, the UE may determine a difference in timing between an earliest one of the neighbor cells and a latest one of the neighbor cells.

The cells 810, 812, 814 may transmit the SSBs 820, 822, 824 again based on an SSB burst periodicity 850. The SSB burst periodicity 850 may be significantly greater than the maximum timing offset 832. For example, the SSB burst periodicity 850 may be 20 ms or a multiple thereof. The UE 104 may schedule measurements of a plurality of receive beams over one or more SSBs based on the beam switch time unit. For example, the UE 104 may schedule a beam measurement on each of the PBCH symbols when the beam switch time unit is two symbols or less. The UE may schedule measurements of the receive beam for each cell based on the respective SSB 820, 822, 824 in parallel.

At block 860, the UE 104 may measure the SSBs 820, 822, 824 based on the DMRS of the PBCH symbols within each SSB. Because the UE 104 may perform multiple measurements per SSB, the UE 104 may measure a configured set of receive beams more quickly than if only the SSS is used for beam measurements. Accordingly, the UE 104 may transmit a beam measurement report 870 including the beam measurements.

Figure 9:
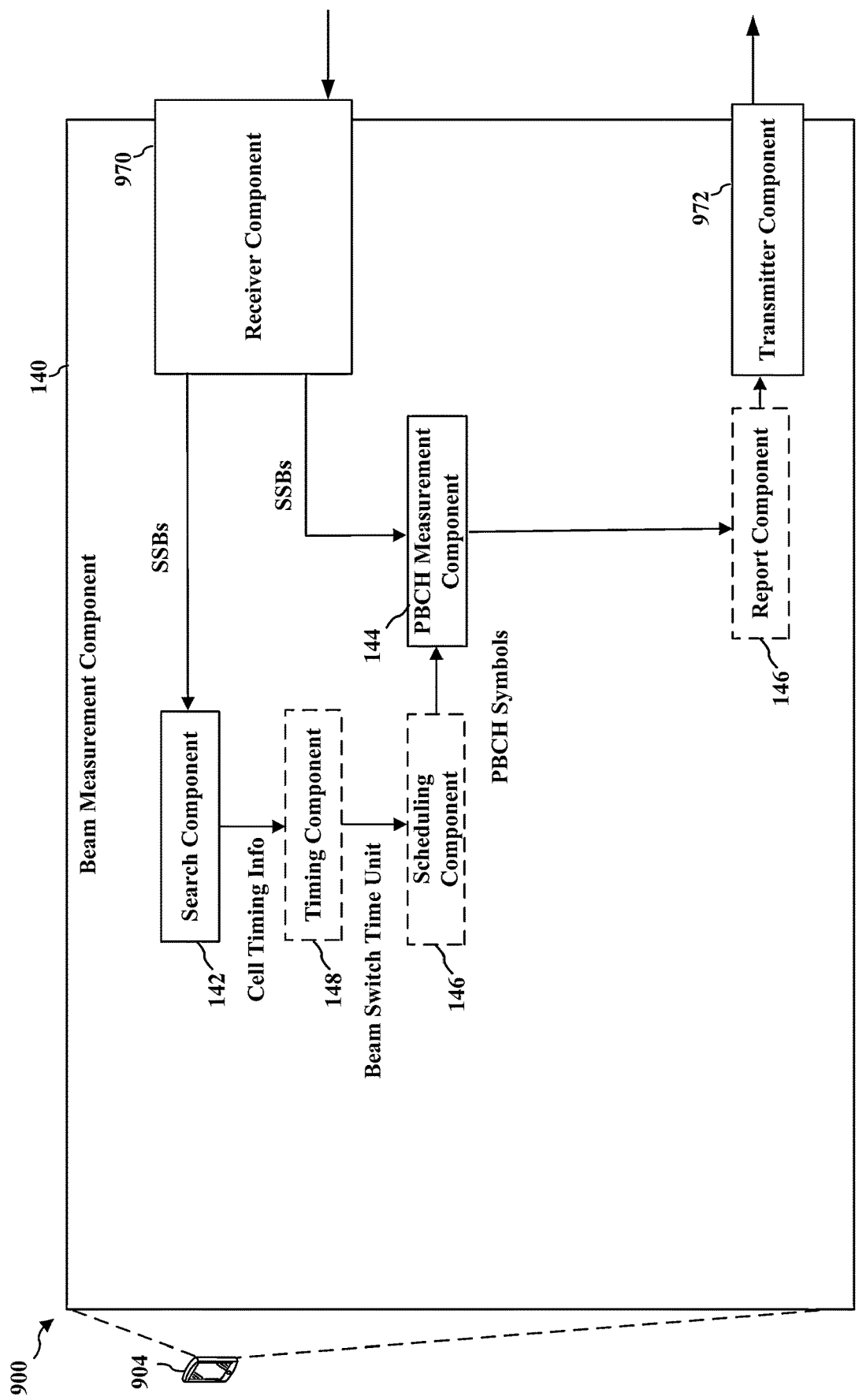
FIG. 9 is a conceptual data flow diagram illustrating the data flow between different means/components in an example UE, which may be an example of the UE 104 and include the beam measurement component.

FIG. 9 is a conceptual data flow diagram 900 illustrating the data flow between different means/components in an example UE 904, which may be an example of the UE 104 and include the beam measurement component 140. As discussed with respect to FIG. 1, the beam measurement component 140 may include the search component 142 and the PBCH measurement component 144. The beam measurement component 140 may optionally include the report component 146, the scheduling component 148, and the timing component 149.

The UE 104 also may include a receiver component 970 and a transmitter component 972. The receiver component 970 may include, for example, a RF receiver for receiving the signals described herein. The transmitter component 972 may include for example, an RF transmitter for transmitting the signals described herein. In some implementations, the receiver component 970 and the transmitter component 972 may be co-located in a transceiver such as the Tx/Rx 354 in FIG. 3.

The receiver component 970 may receive downlink signals such as the SSBs 820, 822, 824. The receiver component 970 may provide the SSBs 820, 822, 824 to the search component 142 and/or the PBCH measurement component 144.

The search component 142 may be configured to perform a cell search for neighbor cells available to the UE in a synchronized network. The search component 142 may receive the SSBs via the receiver component 970. The search component 142 may process the PSS and SSS portions of the SSBs to determine a cell identifier and timing information for each of the neighbor cells. The search component 142 may determine a number of the neighbor cells and timing information for each of the neighbor cells. In some implementations, the search component 142 may provide the number of neighbor cells and timing information to the timing component 149. In other implementations, the search component 142 may perform the functions of the timing component 149, or provide the number of cells and timing information directly to the PBCH measurement component 144.

The optional timing component 149 may be configured to determine the beam switch time unit based on a maximum timing offset between the neighbor cells. The timing component 149 may receive the number of cells and timing information from the search component 142. The timing component 149 may determine the pair of cells with the greatest timing offset among the neighbor cells and set the greatest timing offset as the maximum timing offset. The timing component 149 may determine the beam switch time unit based on the above table 1, for example. The timing component 149 may provide the beam switch time unit to the scheduling component 148.

The scheduling component 148 may be configured to schedule beam measurements on PBCH symbols of the SSBs. The scheduling component 148 may receive the beam switch time unit from the timing component 149. The scheduling component 148 may determine at least one PBCH symbol for each cell within the beam switch time unit. The scheduling component 148 may configure the PBCH measurement component 144 to measure the DMRS during the respective PBCH symbol for each cell. The scheduling component 148 may configure the PBCH measurement component 144 to switch receive beams between beam switch time units.

The PBCH measurement component 144 may be configured to measure one or more receive beams using DMRS of PBCH symbols of SSBs received from the neighbor cells. The PBCH measurement component 144 may measure each receive beam during the beam switch time unit including the PBCH symbol from each of the neighbor cells. The PBCH measurement component 144 may receive the SSBs via the receiver component 970. The PBCH measurement component 144 may receive the timing information from the search component 142, timing component 149, and/or the scheduling component 148. The PBCH measurement component 144 may determine a transmitted sequence for the DMRS for each cell based on the cell ID, SSB index, and timing information. The PBCH measurement component 144 may then measure properties of the DMRS such as the signal to noise ratio (SNR) or signal to noise plus interference ratio (SINR). The measurements may correspond to a particular receive beam and particular cell. The PBCH measurement component 144 may measure a different receive beam for each cell during the next beam switch time unit. The PBCH measurement component 144 may provide the measurements to the report component 146.

The report component 146 may be configured to transmit a beam measurement report including measurements of each of the receive beams to a serving cell. The report component 146 may receive the measurements from the PBCH measurement component 144. The report component 146 may generate the beam measurement report, for example, as a RRC message. The report component 146 may transmit the beam measurement report via the transmitter component 972.

Figure 10:
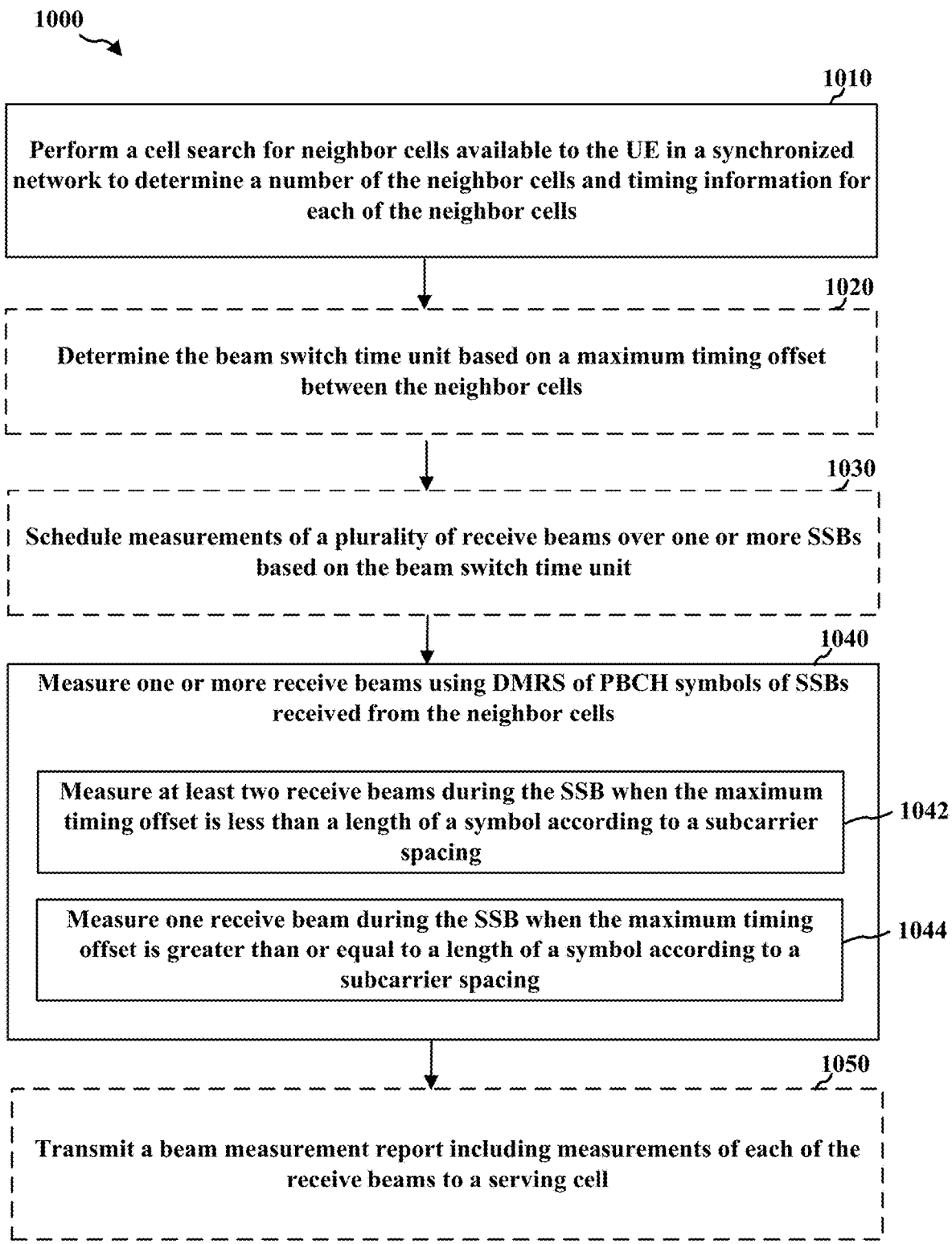
FIG. 10 is a flowchart of an example method for a UE to perform beam measurements on PBCH symbols.

FIG. 10 is a flowchart of an example method 1000 for a UE to perform beam measurements on PBCH symbols. The method 1000 may be performed by a UE (such as the UE 104, which may include the memory 360 and which may be the entire UE 104 or a component of the UE 104 such as the beam measurement component 140, Tx processor 368, the Rx processor 356, or the controller/processor 359). The method 1000 may be performed by the beam measurement component 140 in communication with the synchronized network component 120 of one or more base stations 102. Optional blocks are shown with dashed lines.

At block 1010, the method 1000 performing a cell search for neighbor cells available to the UE in a synchronized network to determine a number of the neighbor cells and timing information for each of the neighbor cells. In some implementations, for example, the UE 104, the Rx processor 356, or the controller/processor 359 may execute the beam measurement component 140 or the search component 142 to perform a cell search for neighbor cells 812, 814b available to the UE 104 in a synchronized network to determine a number of the neighbor cells and timing information for each of the neighbor cells. Accordingly, the UE 104, the Rx processor 356, or the controller/processor 359 executing the beam measurement component 140 or the search component 142 may provide means for performing a cell search for neighbor cells available to the UE in a synchronized network to determine a number of the neighbor cells and timing information for each of the neighbor cells.

At block 1020, the method 1000 optionally includes determining the beam switch time unit based on a maximum timing offset between the neighbor cells. In some implementations, for example, the UE 104, the Rx processor 356, or the controller/processor 359 may execute the beam measurement component 140 or the timing component 149 to determine the beam switch time unit 550, 650, 750 based on a maximum timing offset 540, 640, 740 between the neighbor cells. Accordingly, the UE 104, the Rx processor 356, or the controller/processor 359 executing the beam measurement component 140 or the timing component 149 may provide means for determining the beam switch time unit based on a maximum timing offset between the neighbor cells.

At block 1030, the method 1000 may optionally include scheduling measurements of a plurality of receive beams over one or more SSBs based on the beam switch time unit. In some implementations, for example, the UE 104, the Rx processor 356, or the controller/processor 359 may execute the beam measurement component 140 or the scheduling component 148 to schedule measurements of a plurality of receive beams 182" over one or more SSBs based on the beam switch time unit. Accordingly, the UE 104, the Rx processor 356, or the controller/processor 359 executing the beam measurement component 140 or the scheduling component 148 may provide means for scheduling measurements of a plurality of receive beams over one or more SSBs based on the beam switch time unit.

At block 1040, the method 1000 includes measuring one or more receive beams using DMRS of PBCH symbols of SSBs received from the neighbor cells. In some implementations, for example, the UE 104, the Rx processor 356, or the controller/processor 359 may execute the beam measurement component 140 or the PBCH measurement component 144 to measure one or more receive beams 182" using DMRS 202 of PBCH symbols 244, 248 of SSBs 820, 822, 824 received from the neighbor cells. In some implementations, at sub-block 1042, the block 1040 optionally includes measuring at least two receive beams during each SSB when the maximum timing offset is less than a length of a symbol according to a subcarrier spacing. For example, the PBCH measurement component 144 may measure the DMRS 202 of a first PBCH symbol 244, the receiver component 970 may change the receive beam, and the PBCH measurement component 144 may measure the DMRS 202 of a second PBCH symbol 248 of an SSB. In some implementations, at sub-block 1044, the block 1040 optionally includes measuring one receive beam during each SSB when the maximum timing offset is greater than or equal to a length of a symbol according to a subcarrier spacing. Accordingly, the UE 104, the Rx processor 356, or the controller/processor 359 executing the beam measurement component 140 or the PBCH measurement component 144 may provide means for measuring one or more receive beams using DMRS of PBCH symbols of SSBs received from the neighbor cells.

At block 1050, the method 1000 optionally includes transmitting a beam measurement report including measurements of each of the receive beams to a serving cell. In some implementations, for example, the UE 104, the Tx processor 368, or the controller/processor 359 may execute the beam measurement component 140 or the report component 146 to transmit the beam measurement report 870 including measurements of each of the receive beams to the serving cell 810. Accordingly, the UE 104, the Tx processor 368, or the controller/processor 359 executing the beam measurement component 140 or the report component 146 may provide means for transmitting a beam measurement report including measurements of each of the receive beams to a serving cell.

The following provides an overview of aspects of the present disclosure:

Aspect 1: A method of wireless communication for a user equipment (UE), comprising: performing a cell search for neighbor cells available to the UE in a synchronized network to determine a number of the neighbor cells and timing information for each of the neighbor cells; and measuring one or more receive beams using demodulation reference signals (DMRS) of physical broadcast channel (PBCH) symbols of synchronization signal blocks (SSBs) received from the neighbor cells, each receive beam measured during a beam switch time unit including a PBCH symbol from each of the neighbor cells according to the timing information.

Aspect 2: The method of Aspect 1, further comprising transmitting a beam measurement report including measurements of each of the receive beams to a serving cell.

Aspect 3: The method of Aspect 1 or 2, further comprising scheduling measurements of a plurality of receive beams over one or more of the SSBs based on the beam switch time unit.

Aspect 4: The method of any of Aspects 1-3, further comprising determining the beam switch time unit based on a maximum timing offset between the neighbor cells.

Aspect 5: The method of Aspect 4, wherein measuring the one or more receive beams includes measuring at least two beams during one of the SSBs when the maximum timing offset is less than a length of a symbol according to a subcarrier spacing.

Aspect 6: The method of Aspect 4 or 5, wherein the maximum timing offset includes a maximum synchronization offset and a maximum propagation delay offset.

Aspect 7: The method of Aspect 4, wherein measuring the one or more receive beams includes measuring one receive beam during one of the SSBs when the maximum timing offset is greater than or equal to a length of a symbol according to a subcarrier spacing.

Aspect 8: The method of Aspect 7, further comprising measuring the one or more receive beams using a secondary synchronization signal of the SSBs.

Aspect 9: The method of any of Aspects 4-8, wherein the maximum timing offset is a difference in timing between an earliest one of the neighbor cells and a latest one of the neighbor cells.

Aspect 10: The method of any of Aspects 4-8, wherein the beam switch time unit is at least a sum of the maximum timing offset and a length of a symbol according to a subcarrier spacing.

Aspect 11: An apparatus for wireless communication for a user equipment (UE), comprising: a memory storing computer-executable instructions; and at least one processor coupled to the memory and configured to execute the computer-executable instructions to perform the method of any of Aspects 1-10.

Aspect 12: A apparatus for wireless communication for a user equipment (UE), comprising: means for performing the method of any of Aspects 1-10.

Aspect 13: A non-transitory computer-readable medium storing computer executable code, the code when executed by a processor of a user equipment (UE) causes the processor to perform the method of any of Aspects 1-10.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   performing a cell search for neighbor cells available to the UE in a synchronized network to determine a number of the neighbor cells and timing information for each of the neighbor cells;
   determining a beam switch time unit based on a maximum timing offset between the neighbor cells; and
   measuring one or more receive beams using demodulation reference signals (DMRS) of physical broadcast channel (PBCH) symbols of synchronization signal blocks (SSBs) received from the neighbor cells, wherein a measurement for each of the one or more receive beams is performed during the beam switch time unit that includes a PBCH symbol from each of the neighbor cells according to the timing information.

2. The method of claim 1, further comprising transmitting a beam measurement report including measurement information of each of the one or more receive beams to a serving cell.

3. The method of claim 1, further comprising scheduling measurements of a plurality of receive beams over one or more of the SSBs based on the beam switch time unit.

4. The method of claim 1, wherein the maximum timing offset is determined based on the timing information for each of the neighbor cells.

5. The method of claim 1, wherein measuring the one or more receive beams includes measuring at least two receive beams during one of the SSBs when the maximum timing offset is less than a length of a symbol according to a subcarrier spacing associated with the SSBs.

6. The method of claim 1, wherein the maximum timing offset includes a maximum synchronization offset and a maximum propagation delay offset.

7. The method of claim 1, wherein measuring the one or more receive beams includes measuring one receive beam during one of the SSBs when the maximum timing offset is greater than or equal to a length of a symbol according to a subcarrier spacing associated with the SSBs.

8. The method of claim 7, further comprising measuring the one or more receive beams using a secondary synchronization signal of the SSBs.

9. The method of claim 1, wherein the maximum timing offset is a difference in timing between an earliest one of the neighbor cells and a latest one of the neighbor cells.

10. The method of claim 1, wherein the beam switch time unit is at least a sum of the maximum timing offset and a length of a symbol according to a subcarrier spacing.

11. The method of claim 1, wherein measuring the one or more receive beams includes:
    measuring at least two receive beams during one of the SSBs when the maximum timing offset is less than a length of a symbol according to a subcarrier spacing associated with the SSBs; and
    measuring one receive beam during one of the SSBs when the maximum timing offset is greater than or equal to the length of a symbol according to the subcarrier spacing associated with the SSBs.

12. An apparatus for wireless communication for a user equipment (UE), comprising:
    a memory storing computer-executable instructions; and
    at least one processor coupled to the memory and configured to execute the computer-executable instructions to:
       perform a cell search for neighbor cells available to the UE in a synchronized network to determine a number of the neighbor cells and timing information for each of the neighbor cells;
       determine a beam switch time unit based on a maximum timing offset between the neighbor cells; and
       measure one or more receive beams using demodulation reference signals (DMRS) of physical broadcast channel (PBCH) symbols of synchronization signal blocks (SSBs) received from the neighbor cells, wherein a measurement for each of the one or more receive beams is performed during the beam switch time unit that includes a PBCH symbol from each of the neighbor cells according to the timing information.

13. The apparatus of claim 12, wherein the at least one processor is configured to transmit a beam measurement report including measurement information of each of the one or more receive beams to a serving cell.

14. The apparatus of claim 12, wherein the at least one processor is configured to schedule measurements of a plurality of receive beams over one or more of the SSBs based on the beam switch time unit.

15. The apparatus of claim 12, wherein the maximum timing offset is determined based on the timing information for each of the neighbor cells.

16. The apparatus of claim 12, wherein to measure the one or more receive beams, the at least one processor is configured to measure at least two receive beams during one of the SSBs when the maximum timing offset is less than a length of a symbol according to a subcarrier spacing associated with the SSBs.

17. The apparatus of claim 12, wherein the maximum timing offset includes a maximum synchronization offset and a maximum propagation delay offset.

18. The apparatus of claim 12, wherein to measure the one or more receive beams, the at least one processor is configured to measure one receive beam during one of the SSBs when the maximum timing offset is greater than or equal to a length of a symbol according to a subcarrier spacing associated with the SSBs.

19. The apparatus of claim 18, wherein the at least one processor is configured to measure the one or more receive beams using a secondary synchronization signal of the SSBs.

20. The apparatus of claim 12, wherein the maximum timing offset is a difference in timing between an earliest one of the neighbor cells and a latest one of the neighbor cells.

21. The apparatus of claim 12, wherein the beam switch time unit is at least a sum of the maximum timing offset and a length of a symbol according to a subcarrier spacing.

22. The apparatus of claim 12, wherein to measure the one or more receive beams, the at least one processor is configured to:
    measure at least two receive beams during one of the SSBs when the maximum timing offset is less than a length of a symbol according to a subcarrier spacing associated with the SSBs; and
    measure one receive beam during one of the SSBs when the maximum timing offset is greater than or equal to the length of a symbol according to the subcarrier spacing associated with the SSBs.

23. An apparatus for wireless communication for a user equipment (UE), comprising:
means for performing a cell search for neighbor cells available to the UE in a synchronized network to determine a number of the neighbor cells and timing information for each of the neighbor cells;
means for determining a beam switch time unit based on a maximum timing offset between the neighbor cells; and
means for measuring one or more receive beams using demodulation reference signals (DMRS) of physical broadcast channel (PBCH) symbols of synchronization signal blocks (SSBs) received from the neighbor cells, wherein a measurement for each of the one or more receive beams is performed during the beam switch time unit that includes a PBCH symbol from each of the neighbor cells according to the timing information.

24. The apparatus of claim 23, further comprising means for transmitting a beam measurement report including measurement information of each of the one or more receive beams to a serving cell.

25. The apparatus of claim 23, wherein the means for measuring the one or more receive beams is configured to measure at least two receive beams during one of the SSBs when the maximum timing offset is less than a length of a symbol according to a subcarrier spacing associated with the SSBs.

26. The apparatus of claim 23, wherein the means for measuring the one or more receive beams is configured to measure one receive beam during one of the SSBs when the maximum timing offset is greater than or equal to a length of a symbol according to a subcarrier spacing associated with the SSBs.

27. The apparatus of claim 26, wherein the means for measuring the one or more receive beams is configured to measure the one or more receive beams using a secondary synchronization signal of the SSBs.

28. The apparatus of claim 23, wherein the maximum timing offset is a difference in timing between an earliest one of the neighbor cells and a latest one of the neighbor cells.

29. The apparatus of claim 23, wherein the beam switch time unit is at least a sum of the maximum timing offset and a length of a symbol according to a subcarrier spacing.

30. A non-transitory computer-readable medium storing computer executable code, the code when executed by a processor of a user equipment (UE) causes the processor to:
perform a cell search for neighbor cells available to the UE in a synchronized network to determine a number of the neighbor cells and timing information for each of the neighbor cells;
determine a beam switch time unit based on a maximum timing offset between the neighbor cells; and
measure one or more receive beams using demodulation reference signals (DMRS) of physical broadcast channel (PBCH) symbols of synchronization signal blocks (SSBs) received from the neighbor cells, wherein a measurement for each of the one or more receive beams is performed during the beam switch time unit that includes a PBCH symbol from each of the neighbor cells according to the timing information.

* * * * *